United States Patent [19]

Brick

[11] 4,445,161
[45] Apr. 24, 1984

[54] IOINZATION-TYPE LIGHTNING DIVERTER STRIP STRUCTURES

[75] Inventor: Rowan O. Brick, Bellevue, Wash.

[73] Assignee: The Boeing Company, Seattle, Wash.

[21] Appl. No.: 385,758

[22] Filed: Jun. 7, 1982

[51] Int. Cl.³ .............................................. H02H 3/22
[52] U.S. Cl. ..................................... 361/218; 244/1 A
[58] Field of Search ............... 361/117, 119, 212, 213, 361/216, 217, 218, 220, 221, 229; 244/1 A

[56] References Cited

U.S. PATENT DOCUMENTS

| Re. 25,417 | 7/1963 | Amason | 361/218 X |
| 2,616,638 | 11/1952 | George | 361/218 X |
| 3,416,027 | 12/1968 | Amason et al. | 361/117 X |
| 4,237,514 | 12/1980 | Cline | 361/218 X |

Primary Examiner—Harry E. Moose, Jr.
Attorney, Agent, or Firm—Conrad O. Gardner; Bernard A. Donahue

[57] ABSTRACT

An ionization-type lightning diverter strip structure having improved environmental edge and tip sealing. Semi-conductive particle edge configurations and particle distribution geometries for improved streamer formation include forward strip and conductive particle termination and particle distribution geometries having variation along the length of the ionization-type lightning diverter strip structures and multilayer particle distribution geometries to resist particle impact erosion (e.g. rain erosion).

6 Claims, 8 Drawing Figures

U.S. Patent
Apr. 24, 1984
4,445,161
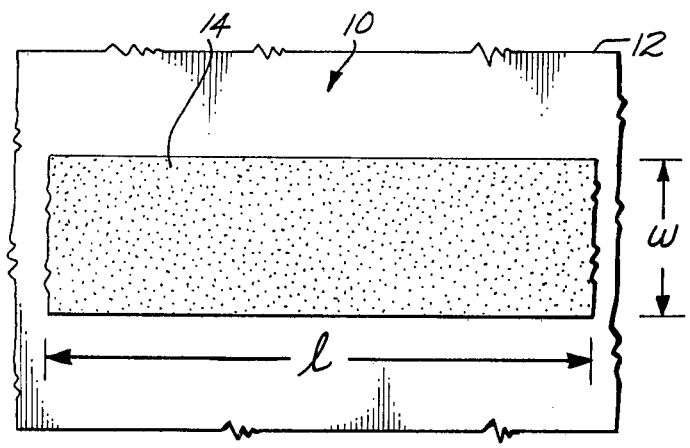
Fig. 1
PRIOR ART
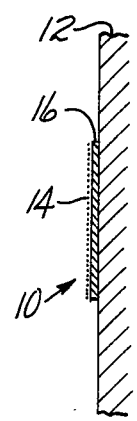
Fig. 2
PRIOR ART
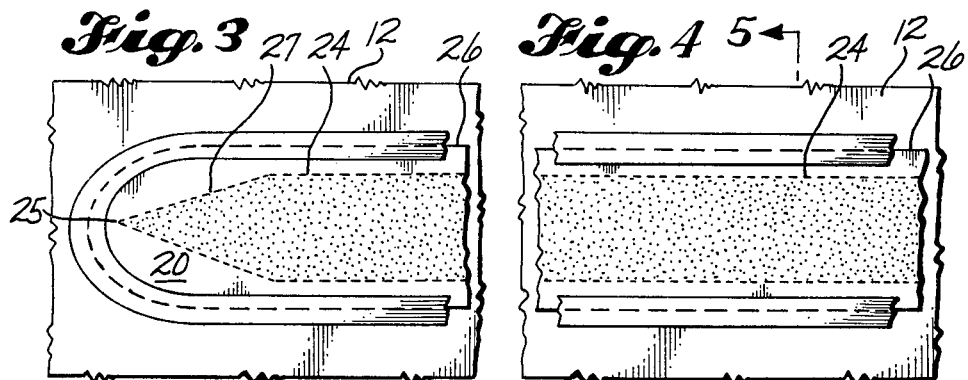
Fig. 3
Fig. 4
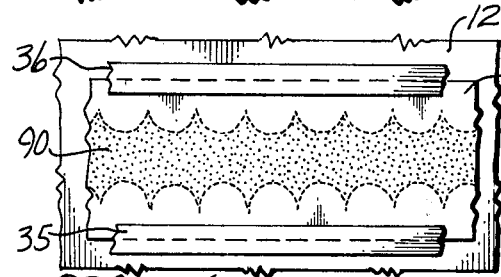
Fig. 6
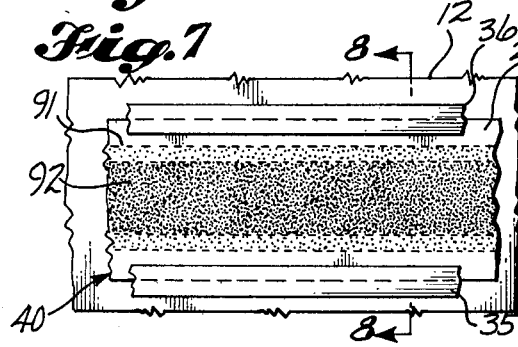
Fig. 7
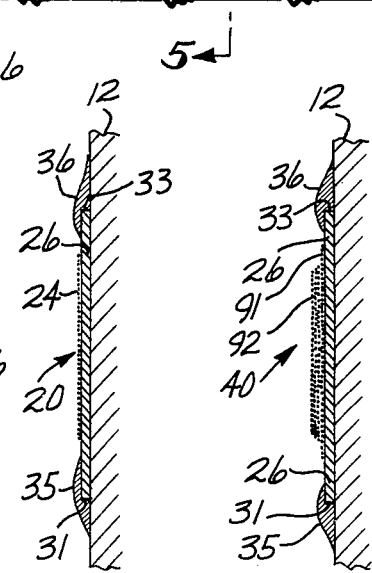
Fig. 5
Fig. 8

IONIZATION-TYPE LIGHTNING DIVERTER STRIP STRUCTURES

The present invention relates generally to aircraft lightning protection systems and, more particularly, to a lightning protection system utilizing lightning diverter strip structures.

Present and contemplated protection systems have utilized metal conductors to shunt lightning currents around the surface of aircraft structures. Such metal conductors have comprised foils, straps, or flame-sprayed materials. Also, the patent literature includes U.S. Pat. No. 4,237,514, issued Dec. 2, 1980, which shows a lightning diverter strip for utilization on an aircraft component, the lightning strip comprising a polyester tape base onto which is bonded, by an epoxy, a coating or layer of uniformly dispersed powdered aluminum particles.

It is an object of the present invention to provide a lightning protection system for use on external surface portions of an aircraft which utilizes aluminum particles deposited on an adhesive tape which is adapted to be secured to the aircraft surface and wherein the distribution of particles is such that the edges of the tape structure are free to be sealed.

It is a further object of the present invention to provide an ionization-type lightning diverter structure wherein the polyester tape base includes a coating or layer of uniformly dispersed powdered aluminum particles having a non-uniform distribution along the length of the polyester tape base.

It is a further object of the present invention to provide a lightning diverter strip structure for use on aircraft components having a strip-like layer of dielectric material for supporting a conductive metal powder of finely divided particles terminated to a tapered tip at one end of the supporting layer of dielectric material.

It is still a further object of the present invention to provide an upper surface of a dielectric layer carrying a conductive metal powder of finely divided particles having a scalloped configuraton along the length of the supporting dielectric layer.

It is another object of the present invention to provide an ionization-type lightning diverter strip structure having a supporting layer of dielectric material bearing a surface coating of aluminum particles having a dimension which is less than the width of the supporting dielectric layer.

It is yet another object of the present invention to provide an ionization-type lightning diverter strip having a dielectric supporting structure of tape-like configuraton for supporting a plurality of layers of decreasing width along the length of the tape with respect to the width of the supporting dielectric tape.

A full understandng of the invention, and of its further objects and advantages and the several unique aspects thereof, will be had from the following description when taken in conjuction with the accompanying sheet of drawings in which:

FIG. 1 is a plan view of an aircraft structure showing a prior art lightning diverter strip applied to an aircraft surface such as a radome;

FIG. 2 is a cross-sectional view along the width W of the prior art lightning diverter strip structure shown in FIG. 1;

FIG. 3 is a plan view of a lightning diverter strip in accordance with a preferred embodiment of the present invention illustrative of the tapered point termination of an end of the conductive particles distributed along the length of the dielectric layer bearing the particles;

FIG. 4 is a plan view taken along the ionization-type lightning diverter strip of FIG. 3 showing the aluminum particle distribution width to be less than the width of the dielectric supporting layer thereby enabling environmental sealing along the width of the supporting dielectric layer portion of the ionization-type diverter strip;

FIG. 5 is a cross-sectional view taken along the lines 5—5 of FIG. 4 showing environmental seal of the ionization-type lightning diverter strip of FIG. 4 and geometry of the conductive particle distribution in relation to the width of the supporting dielectric layer portion of the tape;

FIG. 6 is a plan view of a further embodiment of the present invention showing variable width geometry of conductive particle distribution along the length of the supporting dielectric layer portion of the present ionization-type lightning diverter strip structure;

FIG. 7 is a plan view of a further embodiment of ionization-type lightning diverter strip structures in accordance with the present invention showing multi-layered geometry of aluminum particle distribution along the length of the supporting dielectric layer portion of the lightning diverter strip structure; and, FIG. 8 is a cross-sectional view taken along the lines 8—8 of the ionization-type lightning diverter strip structure of FIG. 7 showing in more detail the decreasing width geometry of superimposed layers along the length of the strip.

Turning now to FIG. 1 and FIG. 2, it will be seen that the prior art lightning diverter strip structures 10 have a bottom dielectric layer 16 adapted to be applied directly to an aircraft component 12, and a binder 14 carrying finely divided metal particles such as finely divided aluminum. The prior art ionization-type lightning diverter strip structures 10 are seen in the cross-sectional view of FIG. 2 to include conductive particle distribution across the width of the supporting dielectric layer 16.

In FIG. 3, it is seen that a present embodiment of ionization-type lightning diverter strip 20 includes a dielectric layer 26 of the same material as shown at 16 in FIG. 2 carrying a conductive metal powder of finely divided particles uniformly distributed along the upper surface area of the dielectric layer 26 as seen in FIG. 2. However, the termination of conductive particled layers 24 is tapered as shown at 27 to a point 25. As seen in FIG. 3 and also FIG. 4, the width of binder material 24 carrying the conductive metal powder of finely divided particles is less than the width of supporting dielectric layer portion 26 along the length of ionization-type diverter strip 20 in contrast to the equal widths of particle layer 14 and dielectric layer 16 shown in the prior art ionization-type lightning strike diverter strip 10 shown in FIG. 2. The cross-sectional view in FIG. 5, taken along the lines 5—5 of FIG. 4, more clearly shows the widths of particled layer 24 in relation to the greater widths of dielectric supporting layer 26 of ionization-type lightning diverter strip 20. The cross-sectional geometry of ionization-type lightning diverter strip 20, as shown in FIG. 5, allows tape strip 20 edges 31 and 32 to be environmentally sealed at 35 and 36 to aircraft surface 12, thereby preventing edge failing and loss of integrity at the seal of ends 31 and 33 to the aircraft surface 12. Environmental sealant 35 and 36 used respectively at edges 31 and 33 may comprise, for example, a polyurethane paint to make the environmental seal. In the structure of fIG. 5, it can be seen that environmental sealing is provided while still allowing ease of formation of streamer along the unsealed edges of aluminum particle layer 24.

Turning now to FIG. 6, it will be seen that the layer of conductive metal powder of finely divided particles deposited along the upper surface area of dielectric layer 26 is provided with a non-uniform width along the length of the supporting dielectric layer portion 26 of the tape. An undulating configuration is shown at 90 of the conductive metal powder of finely divided particles for control and formation of the streamer along the unsealed portion of dielectric layer 26.

FIG. 7 is a plan view of a further embodiment of ionization-type lightning diverter strip structure 40 shown also in cross section in FIG. 8. The upper surface of dielectric layer 26 is shown to include a first layer 91 of binder material carrying a conductive metal powder of finely divided particles such as e.g. finely divided aluminum, this first layer 91 being of a width of less that the width of supporting dielectric layer 26 of tape 40. A further, or second layer 92, of binder 92 carrying finely divided metal particles such as finely divided aluminum is shown superimposed on the first layer 91, further layer 92 being of a width less than first layer 91, along the length of ionization-type lightning diverter strip 40. The environmental sealing feature seen at the sides of the strip 40, viz at 35 and 36, is seen outside the boundary of first conductive particled layer 91, thereby preventing edge effect of the streamer along the length of strip 40. Second, or further layer 92, of finely divided aluminum particles in the embodiment of FIGS. 7 and 8 provides improvement in rain erosion characteristics.

What is claimed is:

1. A lightning diverter structure for an aircraft external surface comprising in combination therewith:
   a strip-like layer of dielectric material of generally rectangular cross section having a lower surface adapted to be applied to the aircraft external surface, said strip-like layer of dielectric material of generally rectangular cross section having an upper surface area opposite said lower surface; and
   a strip-like layer of binder on said upper surface containing a conductive metal powder of finely divided metallic particles deposited in said binder, said strip-like layer of binder having a predetermined width and thickness, and extending generally colinearly with respect to the length of said strip-like layer of dielectric material, said predetermined width in a plane parallel to said upper surface area being less than the width in a plane parallel to said upper surface area of said strip-like layer of dielectric material.

2. A lightning diverter structure according to claim 1 wherein said predetermined thickness in a direction perpendicular to said upper surface area is greater at the center of said strip-like layer of binder between the edges thereof along the length than at the edges thereof along the length.

3. A lightning diverter structure according to claim 1 wherein the width of one end of said strip-like layer of binder includes a tapered region extending to an end point.

4. A lightning diverter structure according to claim 1 wherein said predetermined width is variable along the length of said strip-like layer of binder.

5. A lightning diverter structure according to claim 4 wherein said predetermined width varies in an undulating manner along said length of said strip-like layer of binder.

6. A lightning diverter structure for an aircraft external surface comprising in combination therewith:
   a strip-like layer of dielectric material of generally rectangular cross section having a lower surface adapted to be applied to the aircraft external surface, said strip-like layer of dielectric material of generally rectangular cross section having an upper surface area opposite said lower surface;
   a layer of binder distributed over a region of said upper surface, said layer of binder containing a conductive metal powder of finely divided metallic particles deposited in said binder;
   a layer of edge sealant distributed over a further region of said upper surface and over a portion of said aircraft external surface; and
   wherein the width of said layer of binder is less than the width of said strip-like layer of dielectric material.

* * * * *